(12) United States Patent
Iglio et al.

(10) Patent No.: US 10,870,125 B2
(45) Date of Patent: Dec. 22, 2020

(54) PAINTING BOOTHS COMPRISING PAINTING CHAMBERS AND OVERSPRAY REMOVAL UNITS

(71) Applicant: GEICO S.p.A., Cinisello Balsamo (IT)

(72) Inventors: Valerio Iglio, Monza (IT); Alessandro Di Lucrezia, Cinisello Balsamo (IT)

(73) Assignee: GEICO S.P.A., Cinisello Balsamo (IT)

( * ) Notice: Subject to any disclaimer, the term of this patent is extended or adjusted under 35 U.S.C. 154(b) by 70 days.

(21) Appl. No.: 15/780,058

(22) PCT Filed: Nov. 28, 2016

(86) PCT No.: PCT/IB2016/057150
§ 371 (c)(1),
(2) Date: May 30, 2018

(87) PCT Pub. No.: WO2017/093874
PCT Pub. Date: Jun. 8, 2017

(65) Prior Publication Data
US 2018/0361419 A1 Dec. 20, 2018

(30) Foreign Application Priority Data
Dec. 2, 2015 (IT) .................... 102015000079570

(51) Int. Cl.
*B05B 14/468* (2018.01)
*B01D 41/02* (2006.01)
(Continued)

(52) U.S. Cl.
CPC ............ *B05B 14/468* (2018.02); *B01D 41/02* (2013.01); *B01D 46/30* (2013.01); *B01D 46/32* (2013.01);
(Continued)

(58) Field of Classification Search
CPC ........ B01D 46/30; B01D 46/32; B01D 46/34; B01D 46/36; B01D 46/38; B01D 53/08;
(Continued)

(56) References Cited

U.S. PATENT DOCUMENTS 3,925,248 A * 12/1975 Moroni ................. B01D 39/02
502/159
4,684,378 A * 8/1987 Bratten ................. B01D 46/36
95/276
(Continued)

FOREIGN PATENT DOCUMENTS

CH 679644 A5 3/1992
DE 102007041008 A1 3/2009
(Continued)

OTHER PUBLICATIONS

Abrams, David. "Airborne Dangers" Apr. 30, 1999, EHS Today, p. 2. (Year: 1999).*
(Continued)

*Primary Examiner* — Karl Kurple
(74) *Attorney, Agent, or Firm* — MH2 Technology Law Group LLP

(57) ABSTRACT

A painting booth may include: a painting chamber and/or an overspray removal unit. Paint may be sprayed in the painting chamber. The painting chamber may be crossed by an air flow for evacuation of overspray from the painting chamber. When exiting the chamber, the air flow may pass through the overspray removal unit in order to remove the overspray from the air flow. The overspray removal unit may include an incoherent mass of cleaning elements kept in a stirred condition, through which the air flow containing the overspray passes so as to release the overspray onto the cleaning elements. A method for removing overspray from air flow exiting a painting booth may include: passing the air flow through an incoherent mass of cleaning elements which are (Continued)

kept in a stirred condition, so as to release the overspray onto the cleaning elements of the incoherent mass.

20 Claims, 2 Drawing Sheets

(51) Int. Cl.
*B05B 14/43* (2018.01)
*B01D 46/30* (2006.01)
*B05B 16/60* (2018.01)
*B01D 46/32* (2006.01)
*B05B 7/14* (2006.01)
*B09B 3/00* (2006.01)
*B05B 16/00* (2018.01)

(52) U.S. Cl.
CPC ............ *B05B 7/1454* (2013.01); *B05B 14/43* (2018.02); *B05B 16/00* (2018.02); *B05B 16/60* (2018.02); *B09B 3/00* (2013.01); *B01D 2258/0258* (2013.01); *B01D 2275/204* (2013.01); *Y10S 55/46* (2013.01)

(58) Field of Classification Search
CPC ....... B01D 53/06; B05B 14/43; B05B 14/437; B05B 16/60
See application file for complete search history.

(56) References Cited

U.S. PATENT DOCUMENTS

| 5,676,753 | A | * | 10/1997 | Josefsson | ................ B05B 14/48 |
| | | | | | 118/326 |
| 5,814,132 | A | * | 9/1998 | Grime | .................... B01D 53/04 |
| | | | | | 95/123 |
| 6,010,571 | A | * | 1/2000 | Josefsson | ................ B05B 14/48 |
| | | | | | 118/326 |
| 2004/0137144 | A1 | * | 7/2004 | Shutic | ................... B05B 7/1404 |
| | | | | | 427/180 |
| 2007/0166463 | A1 | | 7/2007 | Kelly | |
| 2009/0031949 | A1 | * | 2/2009 | Nagase | ................. B05B 7/1404 |
| | | | | | 427/180 |
| 2009/0209188 | A1 | * | 8/2009 | Wieland | ................. B01D 46/24 |
| | | | | | 454/54 |
| 2011/0041691 | A1 | * | 2/2011 | Weschke | ............ B01D 46/0068 |
| | | | | | 95/278 |
| 2011/0262324 | A1 | * | 10/2011 | Fritz | ..................... B01D 46/543 |
| | | | | | 423/210 |
| 2013/0122188 | A1 | | 5/2013 | Fritz et al. | |
| 2014/0134339 | A1 | * | 5/2014 | Holler | ................ B01D 46/0057 |
| | | | | | 427/331 |

FOREIGN PATENT DOCUMENTS

DE  102013011107 A1  8/2014
FR  2094304 A5  2/1972

OTHER PUBLICATIONS

Crangle, Jr., Robert D. "Diatomite" 2010, USGS 2010 Minerals Yearbook, 22.1-22.6. (Year: 2010).*
Petrovic, Dragan, V. et al. "On the Particles Size Distributions of Diatomaceous Earth and Perlite Granulations". Stronjniski vestnik—Journal of Mechanical Engineering 57 (2011) 11, pp. 843-850. (Year: 2011).*
"Definition of Material at Dictionary.com", 2020 Dictionary.com, LLC, p. 1/7. (Year: 2020).*
International Search Report and Written Opinion dated Mar. 9, 2017, in International Application No. PCT/IB2016/057150, 12 pages.

* cited by examiner

PAINTING BOOTHS COMPRISING PAINTING CHAMBERS AND OVERSPRAY REMOVAL UNITS

CROSS-REFERENCE TO RELATED APPLICATION(S)

This application is a national stage entry from International Application No. PCT/IB2016/057150, filed on Nov. 28, 2016, in the Receiving Office ("RO/IB") of the World Intellectual Property Organization ("WIPO"), published as International Publication No. WO 2017/093874 A1 on Jun. 8, 2017, and claims priority under 35 U.S.C. § 119 from Italian Patent Application No. 102015000079570, filed on Dec. 2, 2015, in the Italian Patent and Trademark Office ("ITPO"), the entire contents of all of which are incorporated herein by reference.

The present invention relates to a booth of the type used for performing painting using spray paint, provided with an innovative system for removal of the overspray. The invention also relates to a method for eliminating the overspray and to a plant.

In the art of spray-painting the problem of so-called "overspray", namely the sprayed paint which is not deposited on the part to be painted and which must therefore be removed from the painting booth, is well-known. The removal of the overspray is usually performed by means of a suitable air flow which crosses the booth.

The air flow evacuated from the booth must therefore be purified of the paint before it can be released into the environment or introduced again into the booth.

For this purpose, various separation systems, for example of the type using water, electrostatic type or with integrated filters suitable for filtering the liquid particles, have been proposed.

These systems are generally complex and require a high degree of maintenance owing to the adhesive nature of the paint.

Powder inerting systems have been proposed where the air flow is conveyed through a filter system composed of a chamber inside which a suitable inerting product in powder form (for example calcium carbonate) is blown, said powder absorbing the particles of paint and being then intercepted by normal dust filters.

This system requires, however, a relatively large quantity of powder which must then disposed of, with high disposal costs. The procurement of the powders is not always easy and may be costly. Moreover, relatively complex techniques are necessary for moving the powder, blowing it in a uniform manner inside the chamber, intercepting it and evacuating it in an efficient manner from the air flow after absorption of the paint.

The said filters are costly and require relatively frequent maintenance in order to prevent them from becoming completely blocked up.

Moreover, the substantially random distribution of the powder inside the chamber may not be sufficient to prevent the paint from adhering to the walls of the chamber and to eliminate securely all the overspray. Also attempts to provide a greater concentration of powder along the path of the air flow have proved to be not entirely satisfactory.

The general object of the present invention is to provide a method for removing the overspray, a painting booth with an overspray removal system and a plant which is able to achieve effective removal of the overspray. Further objects are those of ensuring less maintenance, lower management and consumable material costs and fewer disposal problems.

In view of these objects, the idea which has occurred is to provide, according to the invention, a painting booth comprising a painting chamber in which paint is sprayed and which is crossed by an air flow for evacuation of overspray from the chamber, the air flow exiting the chamber passing through an overspray removal unit for removing the overspray from the air flow, characterized in that the removal unit comprises an incoherent mass of cleaning elements kept in a stirred condition, through which the air flow containing the overspray passes so as to release the overspray onto the cleaning elements.

The idea which has also occurred is to provide a plant comprising the booth and also a system for evacuating the cleaning elements from the overspray removal unit and, if desired, a unit for combustion of the cleaning elements, supplied by the evacuation system.

Another idea which has occurred is to provide a method for the removal of overspray from the air flow exiting a painting booth and comprising the step of passing the air flow through an incoherent mass of cleaning elements which are kept stirred, in order to release the overspray onto the cleaning elements.

In order to illustrate more clearly the innovative principles of the present invention and its advantages compared to the prior art, an example of embodiment applying these principles will be described below with the aid of the accompanying drawings. In the drawings.

Figure 1:
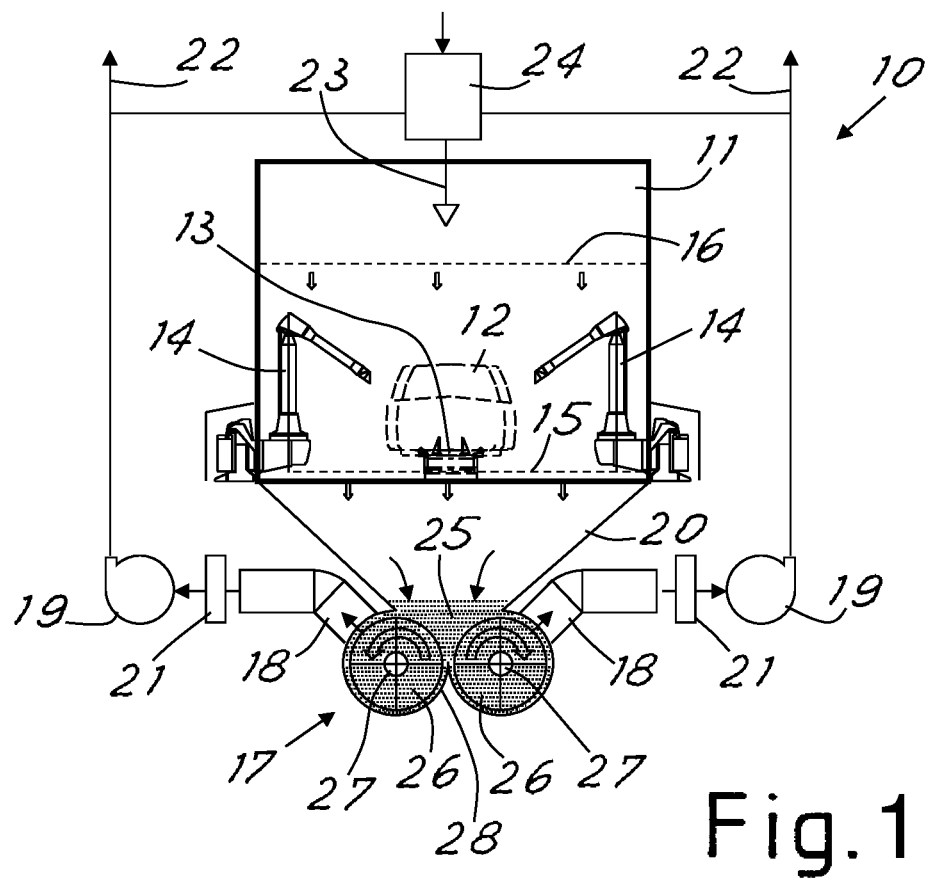
FIG. 1 shows a schematic front view of a painting booth applying the principles of the invention.

With reference to the figures, FIG. 1 shows a painting booth according to the invention, denoted generally by 10.

The booth comprises a chamber 11 for painting objects 12 (for example motor vehicle bodies). The objects to be painted are advantageously transported into the chamber 11 by means of a known conveyor system 13, for example an intermittent or continuous conveying line.

The chamber 11 is provided with painting devices or operator units 14 which, when activated, spray liquid paint onto the surfaces of the object to be painted. Advantageously, the painting devices may be realized by means of known robot arms which are provided with spray guns or cups at their ends.

An air flow is passed through the chamber 11 in order to remove the overspray from it.

Advantageously, this is obtained by means of a floor 15 of the chamber 11 composed of grilles through which the chamber air is drawn in order to evacuate the overspray from the chamber. The ceiling of the chamber is therefore provided with air inlets 16 which are also advantageously provided with grilles and filters so as to have a continuous air flow which passes vertically through the chamber from the top downwards during the painting operations. The air flow exiting the chamber with the overspray is conveyed to an overspray removal unit 17 from which the cleaned air exits through ducts 18. Suitable aspirators or fans 19, which are present along the air path, suitably move the air flow.

The unit 17 may be situated directly underneath the grilled floor of the booth or may be connected to the air outlet of the booth by means of suitable conveyors. For example, funnel conveyors 20 may be provided underneath the floor of the booth. Where necessary the inner wall of the conveyors may be lined with a known anti-adhesive material or removable film to prevent adhesion of the overspray.

For reasons which will become clear below, the outlet of the unit 17 may also be provided with known dust filters 21.

The air flow, after passing the overspray removal unit 17 and being purified, may be evacuated externally via a duct 22 and/or be conveyed back into the chamber via ducts 23.

A known air supply system 24, which may have associated known treatment systems, may also be provided with the possibility of recirculating or entirely changing the air to be conveyed to the chamber.

According to the principles of the invention, the removal unit 17 comprises an incoherent mass of cleaning elements 25 kept in a stirred condition, through which the air flow containing the overspray is passed so as to release the overspray onto the elements of the mass before the air flow leaves the ducts 18. Advantageously, the cleaning elements are heaped together in the mass, in contact with each other, apart from the interstices, which are naturally created between them and through which the air crossing the mass passes, also owing to the stirring movement.

In addition to exposing all the parts of the elements to the paint, the stirring movement also prevents the cleaning elements from stably adhering to each other and the interstices from being closed up by the paint.

Advantageously, the dimensions of the cleaning elements are greater by at least a factor of 100, and preferably 100 and 10,000 times greater, than the size of an average droplet of overspray. Preferably, the cleaning elements have at least a greater size that is between 500 and 5000 (advantageously, around 1000) times the average size of the droplets of overspray. For example, usually the droplets of overspray are atomized with an average size of 7-15 microns.

Preferably, the elements 25 of the mass may have a size of around 1 mm or more.

For example, the elements 25 may have a generally defined (cylindrical, conical, spherical, cube-like, tetrahedral, etc.) or irregular shape. For example, in the case of a generally cylindrical shape, the elements 25 may have a diameter between 3 and 10 mm (preferably around 6 mm) and length between 5 and 50 mm (preferably between 10 and 30 mm).

The irregular shape may be a shape which is directly produced by the method used to obtain the cleaning elements or may be obtained by means of subsequent processing. For example, these elements may consist of chips, namely produced from wood or similar material reduced into irregular flakes or scales.

Inert material elements may also be used. In particular, clay (for example, balls of expanded clay) may be used. Expanded clay is light, relatively inexpensive, has good paint-absorbing properties and may also be cleaned of the paint by means of combustion of the paint, so that it can be used again or disposed of differently.

The layer of cleaning elements which the air must pass through will be regulated so as to obtain the desired removal of overspray, keeping the pressure drop within acceptable limits so as not to cause excessive obstruction of the air flow passage. This will also depend on the shape and size of the elements in the mass, which will leave more or less space free between one element and the next one in the incoherent mass.

The cleaning elements may be made of a material which does not absorb the paint, but which remains coated by it (for example plastic, glass or metal). In this case, a useful shape may be a generally spherical shape, even though other shapes may be used. Once these elements are sufficiently coated with paint they may be replaced with other elements which have not been coated yet, and may be destroyed or suitably cleaned and if necessary used again.

The cleaning elements may also be preferably made of plant material, being obtained also from agricultural plant waste (for example hay chaff), sawdust, etc.

The cleaning elements may be, for example, made by means of conversion of the chosen material into pellet form. Advantageously, they may consist for example of pellets obtained from wood shavings. Plant-derived pellets may be inexpensive, light and easily transportable. With low-cost materials it becomes advantageous to eliminate the cleaning elements once they have been coated or become impregnated with paint in an amount such that they can no longer adequately perform their function of retaining the overspray. Depending on the chosen material, elimination may be performed in various ways. For example, the elements may be burned, used to form part of construction materials, etc.

In the case where the cleaning elements have a structure (for example sawdust pellets) such as to produce dust, the optional filters 21 prevent this dust from being carried away by the air flow and expelled or introduced into the booth.

In order to stir the mass, so as to allow the air to pass through the mass and expose all the cleaning elements to the overspray, various systems may be used.

In particular, it is advantageous to use a mechanical stirrer, per se of the known type (for example with a motor-driven component rotating inside the mass, a vibrating surface, etc.), in order to keep the mass of cleaning elements stirred in a manner suitable for allowing circulation of the air inside it and at the same time widespread exposure of the surface of the elements to the overspray conveyed by the air mass, such that the overspray is suitably removed from the air flow; moreover, stirring of the cleaning elements causes them to rub both against the containing surface and against the stirring devices, preventing the cumulative soiling thereof.

FIG. 1 shows an example of a stirring system formed by a tank or chamber 28 inside which a suitable stirring device rotates. The stirring device may, for example, comprise vanes, arms or surfaces which are varyingly inclined and which rotate inside the mass of cleaning elements.

In particular, the tank or chamber 28 may be shaped and have motor-driven mixing devices 26 rotating at suitable speeds about a shaft 27. The devices may also be two in number, for example also counter-rotating with respect to one another.

Among the stirring systems the rotating systems may be of various types; for example it has been found to be advantageous to use a screw feeder or Archimedes screw system for the function of replacing the cleaning elements. The system rotated at a suitable speed keeps the mass of cleaning elements stirred and, if desired, allows easy loading and unloading (also automatically) of the cleaning elements even during operation of the plant. In particular, a controlled inlet (for example with suitable gate valves) may be provided for clean elements at one end and an outlet may be provided for soiled elements at the other end. These inlets and outlets may be for example activated at intervals dependent on the speed at which the elements of the mass are soiled.

If desired, the stirring system and the loading system may also have two separate devices, for example with arms or other stirring elements and with a screw feeder for conveying the cleaning elements from and towards the stirring system, as may be now easily imagined by the person skilled in the art.

Figure 2:
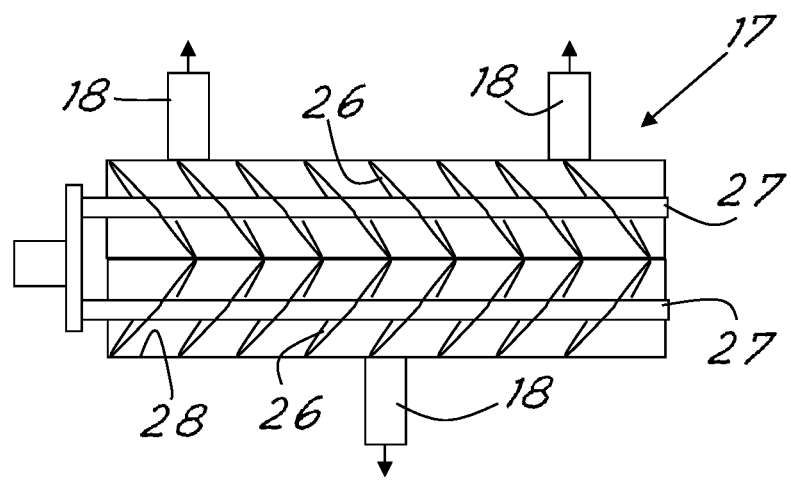
FIG. 2 shows a plan view of a part of the booth according to FIG. 1.

FIG. 2 shows the plan view of a possible embodiment of the unit 17 with two stirrers or two feeder screws 26 arranged alongside each other and with motor-driven shafts 27 arranged horizontal and parallel. The two stirrers occupy the same rotation tank and the same mass of elements being stirred.

As can be seen also in FIG. 1, the air outlets are arranged advantageously to prevent the cleaning elements from spilling out along the air ducts. The air outlet may also be provided with grilles for retaining the elements of the mass inside the rotation tank. For example, the air outlets may be arranged in the top half of the rotating parts. The ducts may be arranged advantageously inclined upwards.

Other stirring devices arranged along the axis of rotation 27, such as suitably shaped vanes, radial mixing rods, etc., may also be used instead of the Archimedes screw.

Different systems, such as a vibrating system, may also be used.

The vibrating system may for example be in the form of a vibrating grating which has openings with a diameter smaller than that of the cleaning elements and on which the mass of elements rests so that it can be crossed by the air while it vibrates.

The feeder screws or the rotating devices may also consist of a number different from that shown. For example, a single feeder screw or more than two feeder screws arranged alongside each other may also be used.

The rotating devices may extend with their axis of rotation along the entire length of the booth floor or be shorter. In the latter case several units 17 aligned along the length of the floor may also be provided.

Figure 3:
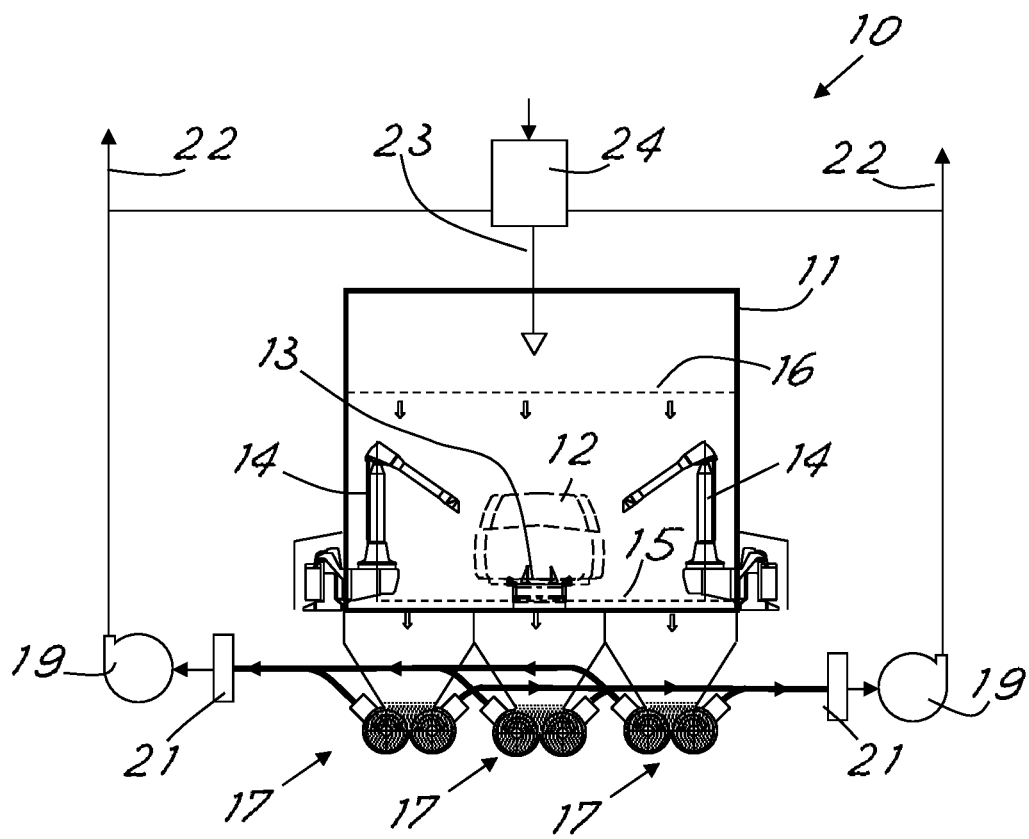
FIG. 3 shows a schematic front view of a second embodiment of a painting booth applying the principles of the invention.

FIG. 3 shows a constructional variant of the booth of FIG. 1, in which the bottom of the booth conveys air with overspray to several units 17 for removing the overspray. In this way, the units 17 may for example be arranged closer to the floor of the booth and/or be smaller, depending on the length of the floor. This may be useful also in the case of particularly long booths. The closeness of the unit 17 to the booth reduces the surfaces exposed to the overspray before it reaches the mass of cleaning elements.

The units 17 may be arranged alongside each other in one or both directions of the length of the floor.

With the systems according to the invention, the soiled incoherent material, which may be easily transported using advantageous known systems, may be burned with recovery of the thermal energy from the overspray and/or of the material itself should it be combustible.

In particular, if the cleaning elements are made of material which is non-combustible at the combustion temperatures chosen for the paint, only the paint may be burned and the cleaning elements used again or the elements thus cleaned may be disposed of in a different way. For example, in the case of expanded clay elements it is possible for only the paint to be burned. If, on the other hand, the chosen material for the cleaning elements is a fuel, these elements may be burned together with the paint once they have performed their overspray retaining function.

Figure 4:
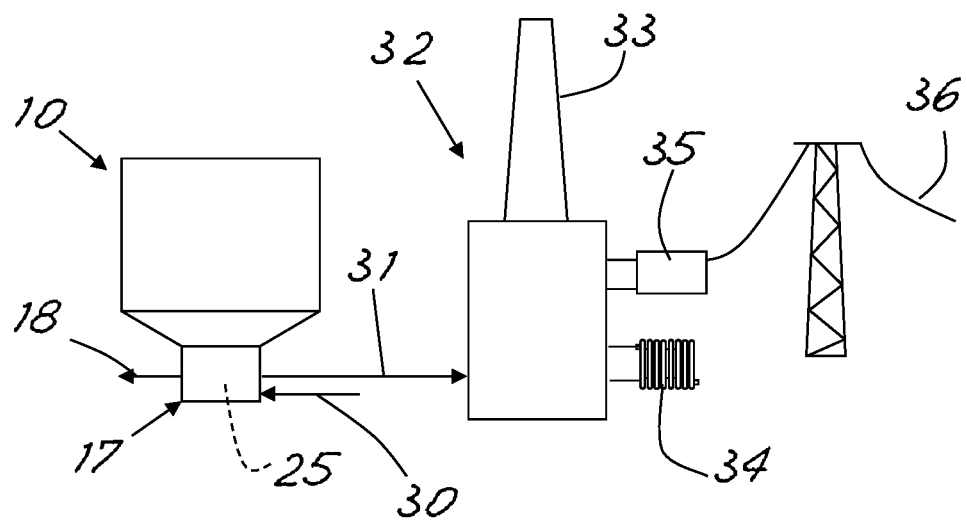
FIG. 4 shows a schematic view of a plant constructed in accordance with the principles of the present invention.

In any case, energy may be advantageously recovered from combustion in a special plant. FIG. 4 shows in schematic form a possible cycle for use of the elements 25.

The plant shown in FIG. 4 comprises a booth 10 of the type realized according to the invention with a unit 17 for removal of the overspray, from which the air, purified of the overspray by means of the mass of cleaning elements 25 kept stirred, exits at 22. The elements of the mass may be introduced into the unit 17 by means of an insertion system 30 known per se (manual, semi-automatic or automatic) and the used elements (in the sense that they no longer are able to perform removal of the overspray with adequate efficiency) may be extracted from the unit 17 by means of an evacuation system 31 known per se (manual, semi-automatic or automatic) and conveyed away for combustion (entirely or only the paint) inside a suitable combustion unit 32 which burns them at an appropriate temperature. A suitable known system 33 for purification of the fumes may be provided.

The combustion unit 32 may be advantageously provided with thermal energy recovery means 34 and/or means 35 for the production of electrical energy from the thermal energy produced during combustion.

For example, a liquid circulation heating system 34 for heating spaces, water or other fluids and/or a thermoelectric generator 35 (advantageously a turbine with alternator) for powering an electric line 36 may be used.

The thermal production may be for example used to heat the same spaces or other parts of the production process of the plant or the factory which uses the booth.

The electrical energy produced may supplement the electric power requirement of the plant or the factory which uses the booth.

In the case of non-combustible cleaning elements, they may be extracted after combustion of the paint for recycling where necessary.

At this point it is clear how the predefined objects have been achieved. The use of a mass of cleaning elements which are kept stirred according to the invention ensures satisfactory removal of the overspray, while keeping the complexity of the removal plant to a minimum. Moreover, the cleaning elements may be easily procured. For example, with the use of pellets obtained from plant waste it is possible to obtain the production of cleaning elements in large amounts and with the need for only limited, low-pollution, production technology, thus solving the problem of disposal of the agricultural waste or the like.

With the system according to the invention it is also possible to obtain a booth without or with short maintenance downtime, since the overspray removal system may operate continuously, owing to the fact that it allows gradual replacement of the elements in the mass.

The cleaning elements may moreover be easily recycled and also allow, if desired, the production of thermal and/or electrical energy, resulting in added value instead of a pure disposal cost.

The essentially fluid behaviour of the mass of cleaning elements enables easy transportation within the plant and said transportation may also be easily automated by means of pipes, belt conveyors and the like.

Inside the overspray removal unit, the surfaces coming into contact with the overspray are subject to an effective paint cleaning action owing to rubbing of the elements of the stirred mass against these surfaces.

Moreover, the overspray removal efficiency is very high since it is the air which is forced to pass through an incoherent mass of cleaning elements which receive the overspray. For example, in powder systems, where it is instead the absorbing material which is blown into the air flow, it is very difficult to ensure a uniform density of the powders, with the consequent high probability that droplets of overspray may pass through intact without making contact with powder particles.

Obviously the above description of an embodiment applying the innovative principles of the present invention is provided by way of example of these innovative principles and must therefore not be regarded as limiting the scope of the rights claimed herein. For example, the booth and the combustion unit may be situated in two locations which are also distant and the conveyor system may also comprise transportation vehicles. The booth and/or the plant may also comprise other known parts, which are not shown here and do not form the subject of the invention, and the operating methods may comprise other operating steps.

The invention claimed is:

1. A painting booth, comprising:
a painting chamber; and
an overspray removal unit;
wherein a paint is sprayed in the painting chamber,
wherein an air flow for evacuation of an overspray from the painting chamber crosses the painting chamber,
wherein when exiting the painting chamber, the air flow which includes the overspray passes through the overspray removal unit in order to remove the overspray from the air flow for evacuation,
wherein the overspray removal unit comprises a removing chamber which includes cleaning elements;
wherein each of the cleaning elements has an individual shape, the individual shape of each of the cleaning elements having at least one dimension greater than 1 millimeter (mm),
wherein at least one funnel conveyor is located directly between the painting chamber and the removing chamber,
wherein the removing chamber comprises a mechanical stirrer for keeping the cleaning elements in a stirred condition, and
wherein in the stirred condition, the cleaning elements are heaped together in a mass, the cleaning elements in contact with each other, the air flow containing the overspray passing through the mass of the cleaning elements so as to release the overspray onto the cleaning elements in the mass.

2. The painting booth of claim 1, wherein the cleaning elements have a size that is between 100 and 10,000 times greater than an average size of paint droplets which form the overspray.

3. The painting booth of claim 1, wherein the mechanical stirrer for keeping the cleaning elements in the stirred condition comprises a rotating stirring device comprising vanes, arms, or surfaces which have varied inclinations and which are configured to rotate inside the mass of the cleaning elements.

4. The painting booth of claim 1, wherein the overspray removal unit comprises transport systems for changing the mass of the cleaning elements present in the removing chamber.

5. The painting booth of claim 4, wherein the transport systems for changing the mass of the cleaning elements comprise screw conveyors with motor-driven shafts.

6. The painting booth of claim 1, wherein the cleaning elements comprise plant material, inert material, or the plant material and the inert material.

7. The painting booth of claim 1, wherein the cleaning elements consist of material in a form of pellets, chips, or the pellets and the chips.

8. The painting booth of claim 1, wherein the individual shape is generally cylindrical, with a diameter between 2 millimeters (mm) and 10 mm, and a length between 3 mm and 40 mm.

9. The painting booth of claim 1, further comprising:
a grilled floor for evacuation of the air flow which includes the overspray from the painting chamber;
wherein the overspray removal unit is below the grilled floor.

10. A plant comprising the painting booth of claim 1, further comprising:
an evacuation system for evacuating the cleaning elements from the overspray removal unit; and
a unit for combustion of the cleaning elements supplied by the evacuation system, the overspray on the cleaning elements supplied by the evacuation system, or the cleaning elements and the overspray on the cleaning elements supplied by the evacuation system.

11. The plant of claim 10, wherein the unit for combustion is configured to recover thermal energy, is configured to produce electricity from the thermal energy, or is configured to recover the thermal energy and to produce the electricity from the thermal energy.

12. The painting booth of claim 1, wherein the cleaning elements have a size that is between 500 and 5,000 times greater than an average size of paint droplets which form the overspray.

13. The painting booth of claim 1, wherein the cleaning elements have a size that is about 1,000 times greater than an average size of paint droplets which form the overspray.

14. The painting booth of claim 4, wherein the mechanical stirrer comprises a screw feeder or an Archimedes' screw system for acting both as a stirring rotating device, for keeping the mass of the cleaning elements in the stirred condition, and as part of the transport systems, for replacing the cleaning elements present in the removing chamber.

15. The painting booth of claim 1, further comprising:
a grilled floor for evacuation of the air flow which includes the overspray from the painting chamber;
wherein there are at least two overspray removal units below the grilled floor.

16. The painting booth of claim 1, wherein the paint comprises liquid paint.

17. The painting booth of claim 1, wherein the overspray comprises liquid paint.

18. The painting booth of claim 1, wherein an average size of paint droplets which form the overspray is greater than or equal to $7 \times 10^{-6}$ meters and less than or equal to $1.5 \times 10^{-5}$ meters.

19. The painting booth of claim 1, wherein the individual shape is generally cylindrical, conical, spherical, cubic, or tetrahedral.

20. The painting booth of claim 1, wherein the individual shape is irregular.

* * * * *